(12) United States Patent
Stephan

(10) Patent No.: US 10,118,570 B2
(45) Date of Patent: Nov. 6, 2018

(54) SHIFT CONSOLE FOR A MOTOR VEHICLE

(71) Applicant: Ford Global Technologies, LLC, Dearborn, MI (US)

(72) Inventor: Joerg Stephan, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/437,855

(22) Filed: Feb. 21, 2017

(65) Prior Publication Data

US 2017/0282814 A1 Oct. 5, 2017

(30) Foreign Application Priority Data

Mar. 31, 2016 (DE) .................. 10 2016 205 294

(51) Int. Cl.
*B60R 13/02* (2006.01)
*B60N 3/10* (2006.01)
*B60R 7/04* (2006.01)
*B60K 20/04* (2006.01)

(52) U.S. Cl.
CPC .......... *B60R 13/0262* (2013.01); *B60N 3/102* (2013.01); *B60R 7/04* (2013.01); *B60K 20/04* (2013.01); *B60R 2013/0287* (2013.01)

(58) Field of Classification Search
CPC .................. B60R 13/0262; B60R 7/04; B60R 2013/0287; B60N 3/102; B60K 20/04

USPC ....................................................... 296/23.34
See application file for complete search history.

(56) References Cited

U.S. PATENT DOCUMENTS 7,794,000 B2 * 9/2010 Ichimaru .................. B60R 7/04
248/311.2

FOREIGN PATENT DOCUMENTS

| CN | 203864517 U | 10/2014 |
|----|-------------|---------|
| DE | 19963222 A1 | 6/2001 |
| DE | 102006002829 A1 | 7/2007 |
| EP | 0747260 B1 | 12/1996 |
| JP | 0582652 A | 4/1993 |
| JP | 1095267 A | 4/1998 |

* cited by examiner

*Primary Examiner* — Joseph D. Pape
*Assistant Examiner* — Dana D Ivey
(74) *Attorney, Agent, or Firm* — Vichit Chea; Price Heneveld LLP

(57) ABSTRACT

A shift console for a motor vehicle includes a receiving region for a shift lever. In order to provide a beverage holder for the central seat of a front seat row of a motor vehicle, the shift console comprises a beverage holder which is able to be stowed in a stowed position in the shift console and which is able to be adjusted into a use position horizontally adjacent to the shift console.

20 Claims, 3 Drawing Sheets

SHIFT CONSOLE FOR A MOTOR VEHICLE

FIELD OF THE INVENTION

The present invention generally relates to vehicles, and more particularly relates to a shift console for a motor vehicle.

BACKGROUND OF THE INVENTION

An essential feature of the functionality and also of the comfort of a motor vehicle, for example a passenger motor vehicle, is the quantity and the arrangement of the storage space available. While large items are able to be stowed in the luggage space, it is usual that for smaller objects, such as maps, pens, beverage containers, etc., options for depositing and/or storage are provided in the passenger compartment, enabling direct and easy access for the driver and/or fellow passengers. To this end, various possibilities are known in the prior art, for example a glove compartment, compartments in the doors, storage areas in the shift console, etc.

A particular problem in vehicles such as vans, minivans or the like, in which seating facilities are provided at the front for three people, for example a driver's seat and a seat bench for two people arranged adjacent thereto, is to provide a beverage holder for the person seated in the middle. This may be a problem, therefore, since the regions in front of this person and on the driver's side typically are largely taken up by control elements which have to be accessible to the driver. The region to the right of this person is in turn generally assigned to a passenger seated there. As a whole, therefore, it is difficult to accommodate storage areas of any type, in particular a beverage holder, for the central passenger.

EP 0747 260 B1 discloses a beverage holder for the interior of a vehicle having a slot-shaped receiver, a vertically-arranged first retaining part being able to be withdrawn or pivoted out from the receiver, in turn an annular second retaining part being rotatably mounted thereon. The second retaining part is able to be moved by rotating from a vertical position into a horizontal position, where it supports a beverage holder at the side, while the first retaining part supports the beverage holder from below.

CN 203864517 U discloses a beverage holder having a vertically extending base part, an upper retaining part and a lower retaining part in each case being fastened to the base part via horizontal pivot axes. Each of the retaining parts has a circular recess for receiving a beverage container. In order to save space when not in use, the two retaining parts may be pivoted from the horizontal into the vertical position, so that they bear against the base part.

JP H05-82652 discloses a beverage holder for an interior of a motor vehicle having a two-part retaining element which has a circular recess for receiving a beverage container. The retaining element is fastened via a horizontal first pivot axis to a clip element, which in turn is fastened via a second horizontal pivot axis, for example, to an extendable element which may also have a ventilation opening. The retaining element consists of two parts which are connected together via a third pivot axis.

It would be desirable to provide for an improved beverage holder for the central seat of a front seat row of a motor vehicle. It is desirable, in particular, that the range of movement of the driver is not restricted unnecessarily or in terms of safety.

SUMMARY OF THE INVENTION

It should be mentioned that the features and measures disclosed individually in the following description may be combined together in any technically expedient manner and disclose further embodiments of the invention. The description characterizes and specifies the invention, in particular additionally in combination with the figures.

According to one aspect of the invention, a shift console for a motor vehicle is provided. The shift console for a motor vehicle includes a receiving region for a shift lever, and a beverage holder which is able to be stowed in a stowed position in the shift console and which is able to be adjusted horizontally into a use position adjacent to the shift console.

According to another aspect of the present invention, a shift console for a motor vehicle is provided. The shift console for a motor vehicle includes a receiving region for receiving a shift lever, and a beverage holder configured to be stowed in a stowed position in the shift console and configured to be adjusted horizontally into a use position adjacent to the shift console.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
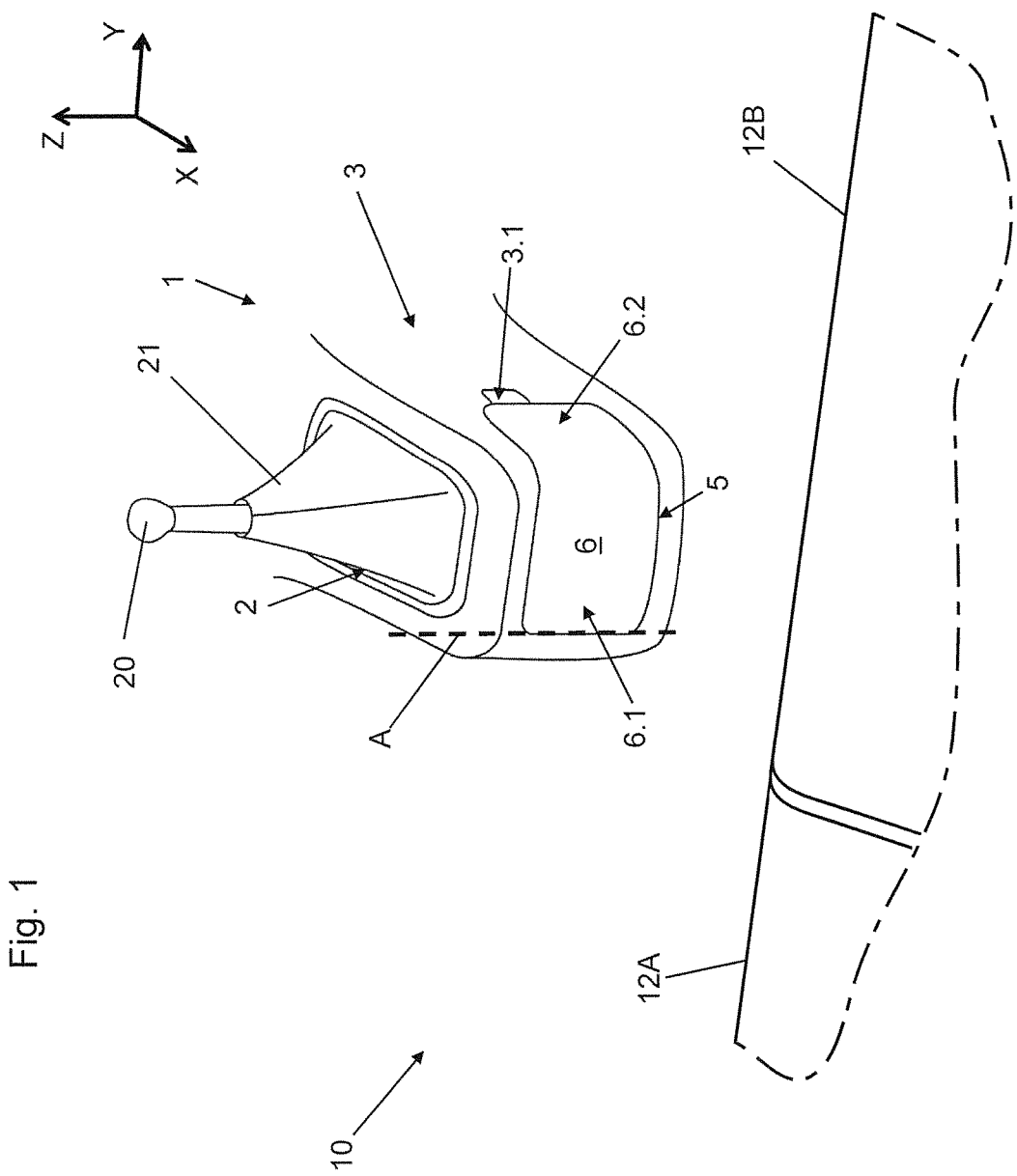
FIG. 1 is a perspective view of a shift console for a motor vehicle with a beverage holder in a stowed position, according to one embodiment.

FIG. 1 shows a shift console 1 of a motor vehicle 10, for example a small van. The shift console 1 has on the upper face (in the direction of the Z-axis) a receiver 2 for a shift lever 20 and a shift boot 21. The shift console 1 may be arranged, for example, on an instrument panel between a driver's seat 12A and a seat bench 12B for two people who are seated adjacent to the driver. In this case, in order to provide an option to a person seated in the middle for depositing a beverage container without this substantially hindering the driver, a beverage holder 5 is arranged on a wall 3 of the shift console 1 extending to the side and to the rear. This beverage holder is located in FIG. 1 in a stowed position, wherein a wall element 6 of the beverage holder 5 forms a portion of the wall 3. With regard to the shape and surface design the wall element 6 is adapted to the other parts of the wall 3. It comprises a rear wall portion 6.1 located to the rear (in the direction of the X-axis) as well as a side wall portion 6.2 extending to the side and extending at an angle thereto (in the direction of the Y-axis). A recess 3.1 is formed on the side wall portion 6.2 in the wall 3, a user reaching therein when he or she wishes to use the beverage holder 5. The wall element 6 is connected to the stationary wall 3 via a vertically-extending first pivot axis A. The first pivot axis A (and further pivot axes to be cited below) may be implemented by hinges. Parts of the beverage holder 5 are stowed in a space-saving manner in a niche 4 located to the rear of the wall element 6 (visible in FIG. 2).

Figure 2:
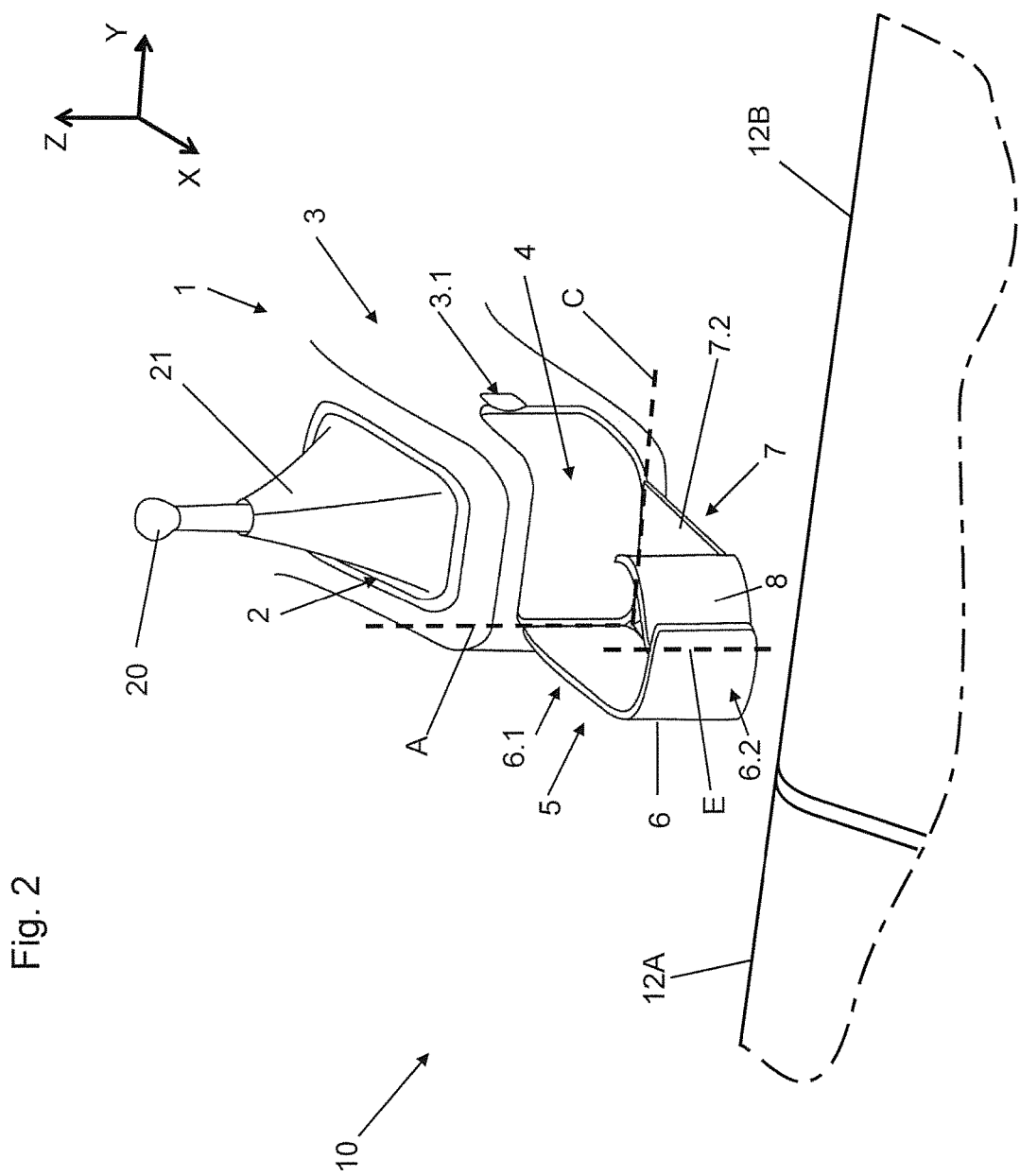
FIG. 2 is a perspective view of the shift console of FIG. 1 with the beverage holder in a use position.

For using the beverage holder 5, said beverage holder is adjusted into the use position by pivoting the wall element 6 about the first pivot axis A which is shown in FIG. 2. In this case, the beverage holder 5 is located to the rear of the shift console 1 (relative to the X-axis). The wall element 6 has been pivoted relative to the stowed position by 90° and now forms a vertically-extending side wall of the beverage holder 5 which, for example, may serve to secure a mug or a bottle at the side. The beverage holder 5 further comprises a base element 7 which includes a first base part 7.1 (shown in FIGS. 3A-3D) and a second base part 7.2. The first base element is connected to the wall element 6 via a second pivot axis B (also shown in FIGS. 3A-3D). The second base part 7.2 is connected to the wall 3 via a third pivot axis C and to the first base part 7.1 via a fourth pivot axis D. In the use position, both base parts 7.1, 7.2 are arranged in the horizontal plane and form a bearing surface for a beverage container. As may be identified from FIG. 2, the wall element 6 is able to support a beverage container on only two sides (left and rear). In order to achieve a support on the right, i.e. on a side opposing the wall element 6, an attachment part 8 is arranged on the wall element 6, said attachment part being pivotable relative to the wall element 6 around a fifth pivot axis E which also extends vertically. Also in this case a spring element may be provided in order to pretension the attachment part 8 in the direction of the use position shown in FIG. 2. When folding in the beverage holder 5 into the stowed position the user is able to pivot the attachment part 8 manually about the fifth pivot axis E in the direction of the rear wall portion 6.1 so that said attachment part does not block the folding-in procedure.

Figure 3A:
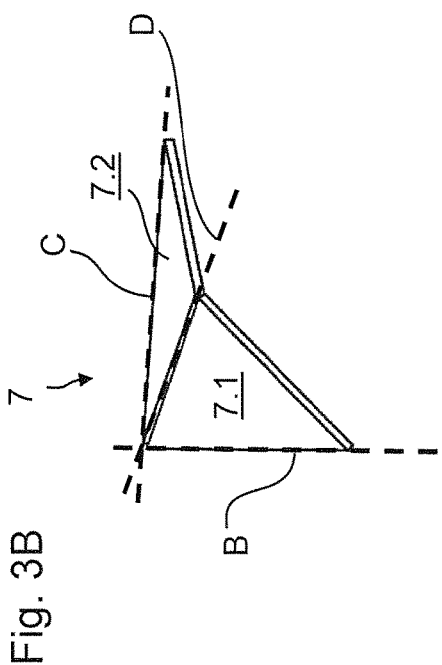
FIGS. 3A-3D are schematic diagrams showing different positions of a base element of the beverage holder of FIGS. 1 and 2 during an adjustment process from the use position into the stowed position.
Figure 3B:
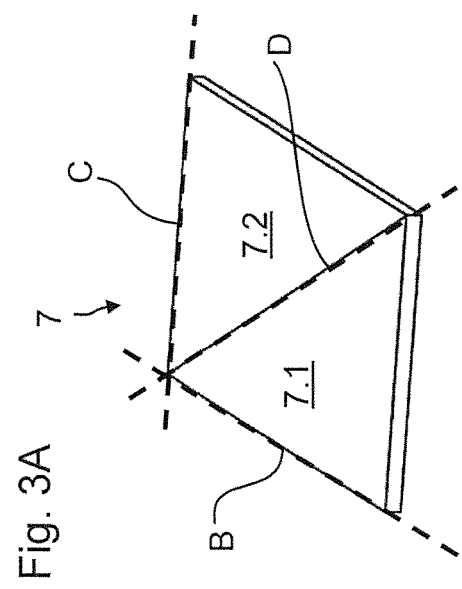
Figure 3C:
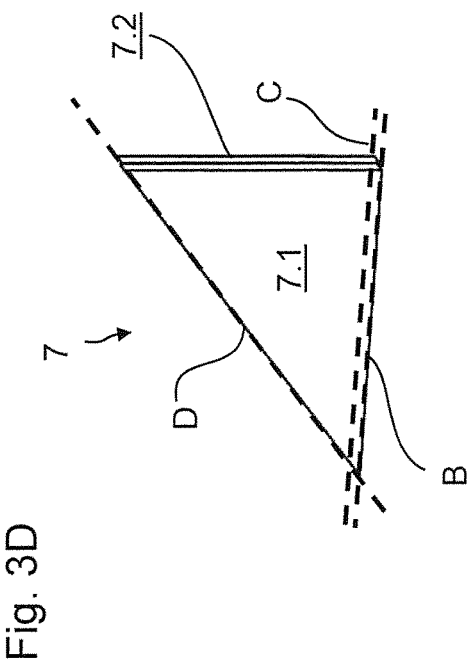
Figure 3D:
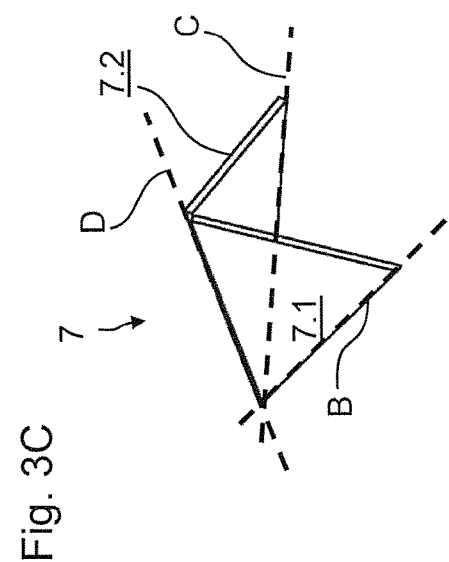

FIGS. 3A-3D shows the mode of operation of the base element 7 with reference to different stages of movement when adjusted from the use position into the stowed position. For improved clarity, the other parts of the shift console 1 and the beverage holder 5 are omitted. The two base parts 7.1, 7.2 are configured in each case to be triangular and when placed against one another produce a square, i.e. each of the two base parts has the shape of an equal-sided right-angled triangle. The first base part 7.1 is connected to the wall element 6 via the horizontally-extending second pivot axis B. The second base part 7.2 is connected to the wall 3 via the third, also horizontally extending, pivot axis C. Along the hypotenuses of the two triangles, the fourth pivot axis D which connects the two base parts 7.1, 7.2 extends at an angle of 45° to the second pivot axis B and to the third pivot axis C. When the wall element 6 is pivoted about the first pivot axis A the second pivot axis B is also pivoted and namely in the horizontal plane in the direction of the third pivot axis C. In this case, the two base parts 7.1, 7.2 are gradually raised and thus are lifted together with the fourth pivot axis D from the horizontal plane which is shown in FIGS. 3B and 3C. Finally, the two base parts 7.1, 7.2 adopt a vertical position and at the same time bear against one another as shown in FIG. 3D which corresponds to the stowed position. Both base parts 7.1, 7.2 are in this case located in the niche 4 and are concealed behind the wall element 6. The fourth pivot axis D in this case adopts an angle of 45° with the horizontal plane.

The shift console for a motor vehicle disclosed herein comprises a receiving region for a shift lever is provided. In this case a console part is regarded as a shift console, the shift lever, i.e., the lever of the gear transmission, being arranged thereon. A shift lever within the meaning of the invention is naturally also a selector lever for an automatic transmission, i.e. also for a semi-automatic transmission. Such a shift console normally has a recess on the upper face which receives the shift lever and optionally a shift gate, a shift boot, etc. The shift lever in this case is arranged with a lower part inside the shift console and protrudes thereover with an upper part. In particular, the shift console may be provided for a motor vehicle which has a front seat row with at least three adjacent seats, for example a truck, a small van, a minibus or a minivan. The shift console in this case may be integrated, in particular, in a front instrument panel and/or adjoin the instrument panel.

According to one embodiment, the shift console comprises a beverage holder which is able to be stowed in a stowed position in the shift console and which is able to be adjusted horizontally into a position of use preferably to the rear of the shift console, adjacent to the shift console. In other words, the beverage holder is able to be adjusted between the stowed position and the use position. In the stowed position, the beverage holder is stowed in the inside of the shift console, which includes the possibility that parts and/or surface portions of the beverage holder are also visible and/or accessible in the stowed position on the outer face of the shift console. In this stowed position, the beverage holder does not take up any unnecessary space and thus does not hinder, for example, the freedom of movement of a driver. Similarly, the beverage holder is protected from damage in the stowed position. To this end, the shift console may have a recess or niche in which the beverage holder is able to be at least partially stowed. In the use position in which the beverage holder is able to receive a beverage container such as a cup, a bottle, a mug or the like, the beverage holder is located horizontally adjacent to the shift console, it could also be said to be alongside the shift console. In this case "horizontally adjacent" denotes any position which is offset along the longitudinal axis (X-axis) and/or the transverse axis (Y-axis) of the vehicle relative to the shift console. By being positioned alongside the shift console, the handling of a shift lever normally arranged on the upper face is impaired and is practically eliminated.

The shift console including the beverage holder may be manufactured, for example, from plastics, optionally fiber-reinforced plastics. Individual elements may also include metal, for example, steel or aluminum.

Advantageously, the beverage holder is able to be adjusted to the rear into a position of use behind the shift console. In other words, the use position in the installed state is on the rear side of the shift console. This is advantageous in that display elements, control elements, ventilation slots or the like are often arranged to the side (in the direction of the transverse axis) of the shift console, which could be concealed by the beverage holder and a beverage container to be received therein.

Preferably, the beverage holder comprises a wall element which in the stowed position forms a wall portion of the shift console, which is adjustable relative to a stationary console part and which in the use position forms a vertically-extending side wall of the beverage holder. The wall element thus fulfills a dual function. In the stowed position it forms a wall portion of the shift console and, therefore, is normally adapted in terms of shape and surface design to the adjacent parts of the wall of the shift console. In other words, it serves for the mechanical protection and as a visual decorative surface of the stowed beverage holder. Moreover, in the use position it forms a side wall of the beverage holder. The side wall extends vertically, i.e. in the direction of the vertical axis, but does not necessarily have to be parallel thereto. It may serve, in particular, to support at the side a container received in the beverage holder and/or to limit the mobility thereof to the side. The stationary console part in the installed state is stationary relative to the remainder of the vehicle, i.e. it does not move when changing from the stowed position to the use position. It may comprise a wall and/or a housing of the shift console, in turn a type of niche being formed therein, where the beverage holder is received in the stowed position.

It is conceivable that the wall element is able to be adjusted by a withdrawal and insertion in a linear manner relative to the stationary console part. According to an alternative embodiment, the wall element is connected to the stationary console part via a vertically-extending first pivot axis. The first pivot axis extends in this case in the direction of the vertical axis (Z-axis) of the vehicle and, in particular, may extend parallel thereto. Such a pivot axis thus permits a pivoting movement of the wall element which takes place at least partially inside the horizontal plane (X-Y-plane). A vertically extending pivot axis is preferred in that, as a result, the center of gravity of the wall element remains at one level and the wall element does not tend to pivot in a specific direction. The first pivot axis, as in the pivot axes to be further cited below, may be produced by at least one hinge which optionally may be configured as a film hinge. A spring element may also be provided on the pivot axis, the wall element being pretensioned thereby in the direction of the use position. In particular, but not exclusively, a blocking element may be provided in this case, the blocking element retaining the beverage holder in the stowed position and having to be released by a user.

According to a further embodiment, the wall element comprises a rear wall portion as well as a side wall portion extending at an angle thereto. In this case, in the stowed position, the rear wall portion is assigned to a rear wall of the shift console and the side wall portion is assigned to a side wall. If in this embodiment a connection is also provided via the first pivot axis, this pivot axis is preferably arranged on the rear wall portion.

Preferably, the beverage holder comprises a base element which in the use position is arranged on a lower region of the wall element. The base element may be arranged, for example, on the lowermost third or lowermost quarter of the wall element. It may include one of more parts. It may be connected rigidly or movably to the wall element. The function of the base element may be to form a lower support or platform for a beverage container. However, it is also conceivable, for example, that the base element has a circular recess, a lowermost part of a beverage container tapering downwardly being able to protrude therethrough.

In particular, in order to permit improved stowage of the beverage holder, the base element is preferably able to be adjusted at least partially relative to the wall element. "At least partially" means that in a multi-part design of the base element at least one of the parts is able to be adjusted. The adjustability may include the base element being able to be displaced and/or pivoted relative to the wall element.

According to one embodiment, the base element is connected both to the wall element and to the stationary console part. Thus, a connection is understood thereby which is present both in the stowed position and in the use position. In order to permit the adjustability of the wall element, in this case it may be normally necessary for the base element to be movable per se, i.e. includes either a flexible material, such as for example a woven fabric or film, or a plurality of parts which are movable relative to one another.

In particular, the base element may comprise a first base part which is connected to the wall element via a second pivot axis and a second base part which is connected to the stationary console part via a third pivot axis and which is connected to the first base part via a fourth pivot axis. This is preferred, in particular, when the wall element is pivotably connected to the stationary console part. In this case, in the use position, the two base parts may be located, in particular, in one plane, for example the horizontal plane, while when adjusted into the stowed position they pivot relative to the wall element, relative to the fixed console part and relative to one another and are folded up to a certain extent until they bear against one another in the stowed position. In this position, they may be located vertically relative to one another, in particular in parallel. Preferably, the fourth pivot axis encloses the same angle with the second pivot axis as it does with the third pivot axis. Further preferably, this angle may be between 40° and 50°, in particular about 45°. In this case, in the use position the fourth pivot axis to a certain extent forms the diagonals of a square area, the sides thereof being marked by the second and third pivot axes. The first and the second base parts may be of triangular configuration, in particular in the form of two equal-sided right-angled triangles. Preferably, the second and/or third pivot axis may extend horizontally in the use position and in the stowed position which, in particular, includes the possibility that they extend horizontally.

According to a further embodiment, an attachment part is arranged on the wall element, the attachment part being able to be stowed inside the shift console in the stowed position and being arranged at least partially opposite the wall element in the use position. In the use position, this attachment part may also form a part of a side wall of the beverage holder and supplement the wall element relative thereto. In the use position, the attachment part is arranged opposite the wall element and namely relative to an interior of the beverage holder which is provided for receiving the beverage container. In this manner, even when the wall element, for example, surrounds the interior only on two sides (for example at the left and rear), a third side (for example at the right) may be at least partially secured by the attachment part. The attachment part may extend, in particular, vertically and may be of curved configuration.

Advantageously, the attachment part may be connected to the wall element via a vertically-extending fifth pivot axis. This fifth pivot axis serves to pivot and to fold in, to a certain extent, the attachment part relative to the wall element when an adjustment into the stowed position is carried out. It is also conceivable here that the attachment part is pretensioned by a spring element in the direction which it adopts in the use position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A shift console for a motor vehicle, comprising:
a receiving region for a shift lever; and
a beverage holder stowable in a stowed position in the shift console and adjustable horizontally into a use position adjacent to the shift console, wherein the beverage holder comprises a wall element and a base element that extends in the use position and at least partially folds in the stowed position.

2. The shift console as claimed in claim 1, wherein the beverage holder is able to be adjusted to the rear into the use position behind the shift console.

3. The shift console as claimed in claim 1, wherein the wall element in the stowed position forms a wall portion of the shift console, which is adjustable relative to a stationary console part and which in the use position forms a vertically extending side wall of the beverage holder.

4. The shift console as claimed in claim 3, wherein the wall element is connected to the stationary console part via a vertically-extending first pivot axis.

5. The shift console as claimed in claim 3, wherein the wall element comprises a rear wall portion and a side wall portion extending at an angle thereto.

6. The shift console as claimed in claim 3 further comprising an attachment part arranged on the wall element, said attachment part being able to be stowed in the stowed position inside the shift console and being arranged at least partially opposite the wall element in the use position.

7. The shift console as claimed in claim 1, wherein the base element in the use position is arranged on a lower region of the wall element.

8. The shift console as claimed in claim 7, wherein the base element is able to be adjusted at least partially relative to the wall element.

9. The shift console as claimed in claim 7, wherein the base element is connected both to the wall element and to the stationary console part.

10. The shift console as claimed in claim 9, wherein the base element comprises a first base part which is connected to the wall element via a second pivot axis and a second base part which is connected to the stationary console part via a third pivot axis and which is connected to the first base part via a fourth pivot axis.

11. A shift console for a motor vehicle, comprising:
a receiving region for receiving a shift lever; and
a beverage holder configured to be stowed in a stowed position in the shift console and configured to be adjusted horizontally into a use position adjacent to the shift console, wherein the beverage holder comprises a wall element and a base element that extends in the use position and at least partially folds in the stowed position.

12. The shift console as claimed in claim 11, wherein the beverage holder is able to be adjusted to the rear into the use position behind the shift console.

13. The shift console as claimed in claim 11, wherein the wall element in the stowed position forms a wall portion of the shift console, which is adjustable relative to a stationary console part and which in the use position forms a vertically extending side wall of the beverage holder.

14. The shift console as claimed in claim 13, wherein the wall element is connected to the stationary console part via a vertically-extending first pivot axis.

15. The shift console as claimed in claim 13, wherein the wall element comprises a rear wall portion and a side wall portion extending at an angle thereto.

16. The shift console as claimed in claim 13 further comprising an attachment part is arranged on the wall element, said attachment part being able to be stowed in the stowed position inside the shift console and being arranged at least partially opposite the wall element in the use position.

17. The shift console as claimed in claim 11, wherein the base element in the position of use is arranged on a lower region of the wall element.

18. The shift console as claimed in claim 17, wherein the base element is able to be adjusted at least partially relative to the wall element.

19. The shift console as claimed in claim 17, wherein the base element is connected both to the wall element and to the stationary console part.

20. The shift console as claimed in claim 19, wherein the base element comprises a first base part which is connected to the wall element via a second pivot axis and a second base part which is connected to the stationary console part via a third pivot axis and which is connected to the first base part via a fourth pivot axis.

* * * * *